Aug. 19, 1941.  F. E. JOHNSON  2,252,932

SHEET METAL NUT AND NUT INSTALLATION

Filed March 21, 1938

Inventor:
Frank E. Johnson.
by Walter J. Jones Att'y.

Patented Aug. 19, 1941

2,252,932

UNITED STATES PATENT OFFICE 2,252,932

SHEET METAL NUT AND NUT INSTALLATION

Frank E. Johnson, Malden, Mass., assignor to United-Carr Fastener Corporation, Cambridge, Mass., a corporation of Massachusetts Application March 21, 1938, Serial No. 197,144

2 Claims. (Cl. 85—32)

This invention relates to improvements in nut members and installations of the same.

An object of my invention is to provide a nut member which may be snapped through an opening in a supporting plate where there is access to only one side of said plate so as to be firmly assembled with said plate for receiving a cooperating bolt member.

Other objects and purposes of my invention will be apparent from inspection of the drawing and specification herein set forth.

Referring to the drawing, in which I have illustrated a preferred embodiment of my invention:

Figure 1:
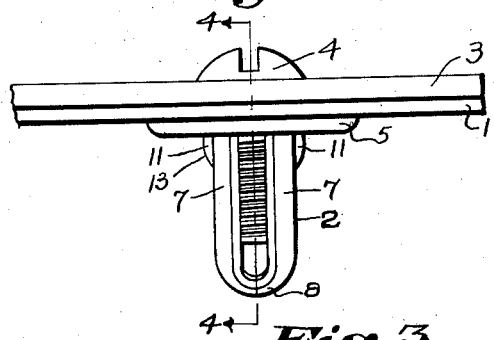
Figure 1 is an edge view showing an installation comprising a plate, my improved nut member assembled with the plate and another part secured to the plate by a bolt engaged with the nut.
Figure 2:
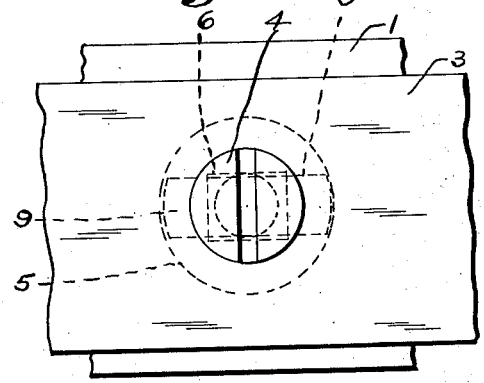
Fig. 2 is a top plan view of the installation shown in Fig. 1.
Figure 3:
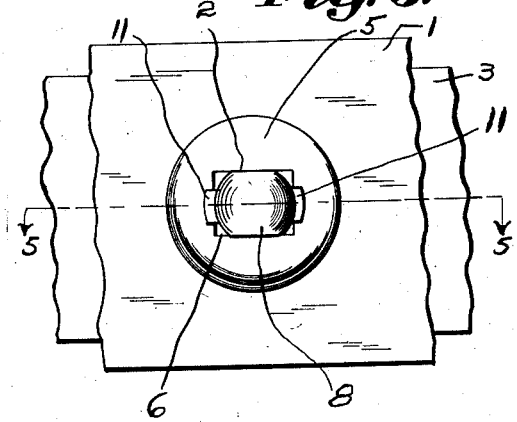
Fig. 3 is a bottom plan view of the installation shown in Figs. 1 and 2.
Figure 4:
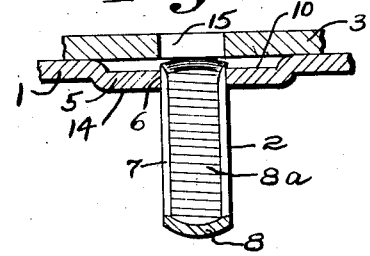
Fig. 4 is a section taken along the line 4—4 of Fig. 1 with the bolt member omitted.
Figure 6:
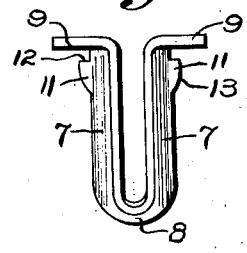
Fig. 6 is an edge view of my improved nut member per se.
Figure 5:
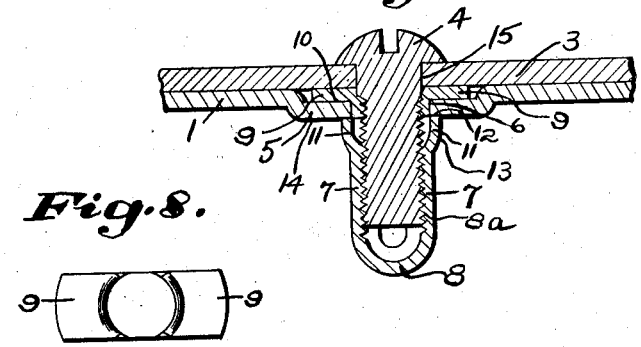
Fig. 5 is a section taken along the line 5—5 of Fig. 3.
Figure 8:
Fig. 8 is a top view of my improved nut member per se.
Figure 7:
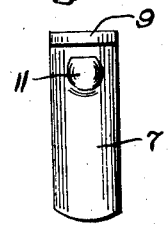
Fig. 7 is a side view of my improved nut member per se, as shown in Fig. 6.

Referring to Figs. 1-5 of the drawing, I have shown a preferred nut installation comprising a supporting structure in the form of a thin metal plate 1, my improved nut member 2 assembled with the plate, and another part, such as the thin supporting plate 3, secured in superposed relation to the plate 1 through means of a bolt 4 in cooperating threaded engagement with the nut 2. The supporting plate 1 is provided with a countersunk portion 5 having an opening 6 therein. The opening 6 is preferably rectangular in shape for aiding to prevent rotation of the nut relative to the plate during engagement of the bolt therewith.

Referring in detail to my improved nut member 2, I have shown one which is preferably formed of one-piece spring metal. My preferred nut member has a bolt-receiving shank-like part comprising a pair of opposed yieldable legs 7—7 connected together at one end of the shank-like part by a bight 8. Each of the legs 7 has a threaded portion 8ª formed by any suitable method on its inner surface and adapted for cooperating fastener engagement with a threaded bolt. In my preferred form each of the legs is bowed so as to be of curved shape in its transverse cross-section whereby the shank-like part of the nut 2 provides a substantially circular bolt-receiving seat for better engagement with the threads of the bolt member. At an opposite end of the shank-like part from the bight 8 I have provided support-engaging portions in the form of flanges 9—9 which extend laterally from the free ends of the legs 7—7 in opposite directions one to another. The flanges 9—9 have a greater end-to-end dimension than the longitudinal diameter of the aperture 6 of the plate 1 and are adapted to engage an upper surface 10 of the plate 1 adjacent the aperture 6, as most clearly shown in Fig. 5. As a means for attachment of the nut to a support I have provided laterally-extending support-engaging portions in the form of bumps 11—11 pressed from the material of the legs 7—7 and extending outwardly from the legs 7—7 in spaced relation to the flanges 9—9. Each of the bumps 11 has a shoulder 12 facing the flanges 9—9 and an outer surface 13 which, in my preferred form, is inclined from adjacent the laterally outermost point of the shoulder 12 to the plane of the respective leg 7. The distance between the inclined surfaces 13 of the bumps 11—11 is greater than the longitudinal diameter of the aperture 6 of the support 1 whereby the surfaces 13 act as cams for pressing the legs 7—7 toward each other to effect entrance of the nut member through the aperture 6 of the plate 1, as will be described.

Assembly of the nut member 2 with the plate 1 is a very simple matter and may be carried out entirely from a position outside the outer surface 10 of the plate. Thus the bight end 8 of the nut member is inserted through the aperture 6 of the plate 1 until the inclined surfaces 13 of the bumps 11—11 engage the surface 10 of the plate adjacent the aperture 6. Next, pressure is exerted upon the flanges 9—9 so as to force the bumps 11—11 through the aperture. This last-mentioned action is effected by reason of engagement of the inclined surfaces 13 of the bumps with material of the plate 1 adjacent the aperture 6 which serves to cam the legs 7—7 toward each other. After the bumps 11—11 have passed through the aperture 6, the legs 7—7 expand through reason of resiliency set up by the bight 8 so as to dispose the shoulders 12—12 behind the inner surface 14 of the plate 1. As a result of this action the shoulders 12—12, which are preferably in substantial engagement with the surface 14 of the plate 1, cooperate with the flanges 9—9 disposed opposite the outer surface 10 of the plate so as to secure the nut to the plate. The plate member 3 may now be superposed upon the surface 10 of the plate 1 with an aperture 15 of the plate 3 in alignment with the bolt-receiving shank of the nut. Finally, the bolt 4 is extended through the aperture 15 of the plate 3 into threaded engagement with the threaded portions 8 of the nut. As the bolt is threaded into the nut the shoulders 12 of the bumps 11—11 are drawn against the inner surface 14 of the plate 1 adjacent the aperture 6, as most clearly shown in Fig. 5, thus providing a secure and efficient fastener device.

As a result of my invention I have provided a nut of simple and inexpensive construction which may be quickly and easily assembled with a supporting plate where access is had to one surface only of the plate thus efficiently carrying out a useful object in the art.

Although I have illustrated and described a preferred form of my invention, I do not wish to be limited thereby because the scope of my invention is best defined in the following claims.

I claim:

1. A fastening device for securing an apertured metallic member to an apertured support comprising a nut member adapted to be inserted through the aperture in said support formed of a single piece of relatively stiff sheet metal and providing a pair of spaced laterally yieldable leg portions connected at the entering end by a bend forming a U-shaped shank which is rigid against axial deformation when in use, a flange portion extending laterally from the opposite end of each leg portion and adapted to overlie a part of the support surrounding the aperture through which said shank may be inserted, a laterally projecting shoulder on the outer face of each leg portion spaced from said flange portion for engagement with the opposite face of said support for preventing displacement of said nut member axially from said support after said member has been snapped in place therein, the inner faces of said leg portions being threaded throughout a substantial portion of their length and presenting a substantially uniform diameter threaded bore, and a threaded fastening member insertable through the apertured metallic member and into the shank from the flanged end, engaging the threaded legs throughout a substantial length thereof, for axially clamping the support and metallic member between the fastening member and the laterally projecting shoulders of said nut member.

2. A fastening device for attachment to an apertured support comprising a nut member adapted to be inserted through the aperture of said support formed of a single piece of relatively stiff folded sheet metal providing a pair of spaced leg portions connected at the entering end by a resilient bend forming a U-shaped shank, which is rigid against axial deformation when in use, a flange portion extending laterally from the opposite end of each leg portion and adapted to overlie a part of the support surrounding the aperture through which said shank may be inserted, a laterally projecting shoulder on the outer face of each leg portion of substantially less width than the width of said leg portion and spaced from said flange portion for engagement with the opposite face of said support, the inner faces of said leg portions being threaded throughout a substantial portion of their length but short of the U-shaped bend and presenting a substantially uniform diameter threaded bore, and a threaded screw insertable into the shank from the flanged end and engaging the threaded legs throughout a substantial length thereof for preventing inward flexing of the legs.

FRANK E. JOHNSON.